(12) United States Patent
Johnston et al.

(10) Patent No.: US 10,412,952 B2
(45) Date of Patent: *Sep. 17, 2019

(54) INSECT PEST MONITOR AND PRODUCT TRANSFER STATION

(71) Applicant: Ecolab USA Inc., Saint Paul, MN (US)

(72) Inventors: Staci J. Johnston, Bursville, MN (US); Douglas B. Gardner, Maplewood, MN (US)

(73) Assignee: Ecolab USA Inc., Saint Paul, MN (US)

( * ) Notice: Subject to any disclaimer, the term of this patent is extended or adjusted under 35 U.S.C. 154(b) by 562 days.

This patent is subject to a terminal disclaimer.

(21) Appl. No.: 15/005,642

(22) Filed: Jan. 25, 2016

(65) Prior Publication Data
US 2016/0242401 A1    Aug. 25, 2016

Related U.S. Application Data

(63) Continuation-in-part of application No. 14/626,254, filed on Feb. 19, 2015, now Pat. No. 10,123,522.

(51) Int. Cl.
*A01M 1/14* (2006.01)
*A01M 1/02* (2006.01)
(Continued)

(52) U.S. Cl.
CPC .............. *A01M 1/14* (2013.01); *A01M 1/02* (2013.01); *A01M 1/103* (2013.01); *A01M 1/026* (2013.01); *A01M 1/2011* (2013.01); *A01M 29/12* (2013.01)

(58) Field of Classification Search
CPC .......... A01M 1/026; A01M 1/02; A01M 1/00; A01M 1/103; A01M 1/10; A01M 1/14; A01M 1/20; A01M 1/2005; A01M 1/2011
See application file for complete search history.

(56) References Cited

U.S. PATENT DOCUMENTS 5,090,153 A    2/1992    Mullen et al.
5,771,628 A    6/1998    Nobbs
(Continued)

FOREIGN PATENT DOCUMENTS

CN    1092481 C    10/2002
EP    1094709 A1    5/2001
(Continued)

OTHER PUBLICATIONS

Israel Patent Office, "The International Search Report and the Written Opinion of the International Searching Authority, or the Declaration", issued in connection to Application No. PCT/US2016/018690, dated Jun. 6, 2016, 11 pages.

*Primary Examiner* — Jessica B Wong
(74) *Attorney, Agent, or Firm* — McKee, Voorhees & Sease, PLC

(57) ABSTRACT

A system, method, and kit for monitoring, capturing, or killing crawling insects, including the population of a colony of insects, is provided. A station is provided including a lower member that may be flat, curved or of varying contour, a curved or angled upper member connected directly or by one or more intermediate members to the lower member, and an adhesive on one of the lower member or the upper member. A secondary element can include a repellant or non-repellant pesticide, an adhesive, and/or an attractant to aid in killing the crawling insects. As the insects interact with the station and secondary element, they can take a portion of the pesticide back to the colony to kill more insects.

5 Claims, 11 Drawing Sheets

(51) Int. Cl.
*A01M 1/10* (2006.01)
*A01M 1/20* (2006.01)
*A01M 29/12* (2011.01)

(56) References Cited

U.S. PATENT DOCUMENTS

| | | |
|---|---|---|
| 5,953,854 A | 9/1999 | Hyatt |
| 6,219,960 B1 | 4/2001 | Contadini et al. |
| 6,343,434 B1 | 2/2002 | Petti |
| 2001/0054249 A1 | 12/2001 | Baker |
| 2004/0088905 A1 | 5/2004 | Price et al. |
| 2008/0072475 A1 | 3/2008 | Nelson et al. |
| 2010/0024278 A1 | 2/2010 | Simchoni-Barak et al. |
| 2016/0000060 A1 | 1/2016 | Sandford et al. |
| 2016/0120164 A1 | 5/2016 | Li |

FOREIGN PATENT DOCUMENTS

| | | |
|---|---|---|
| EP | 2305028 A1 | 4/2011 |
| JP | 2016026483 A | 2/2016 |
| WO | 2014134371 A1 | 9/2014 |

INSECT PEST MONITOR AND PRODUCT TRANSFER STATION

CROSS-REFERENCE TO RELATED APPLICATIONS

This application is a Continuation-In-Part Application of U.S. Ser. No. 14/626,254 filed Feb. 19, 2015, which is herein incorporated by reference in its entirety.

FIELD OF THE INVENTION

This invention relates generally to a crawling insect pest monitor and/or product transfer station and more particularly to a device for use on the exterior or interior of a structure for attracting and killing crawling insect pests entering the station. The crawling pest station is designed to monitor for pest activity in the zone of influence and to expose visiting pests to slow-activating pesticide treatments that result in a transfer of pesticide product back to areas that harbor such crawling insect pests, which will also aid in killing off a colony of insects. The crawling pest station is designed to protect pesticides and tacky surfaces so as to maximize their effective life-span.

BACKGROUND OF THE INVENTION

Crawling pests, such as the German cockroach (*Blattella germanica*) are well known to carry disease and are widely considered to be undesirable insects. The German cockroach is a smaller member of the cockroach family and is frequently a pest in food processing and preparation areas including hotels, nursing homes, hotels and other institutions. They are widespread pests capable of surviving in many different parts of the world. They are a type of thigmotactic insect, meaning that they generally react to a physical stimulus, and here prefer tight spaces. Such insects frequently hide out of sight in cracks and crevices that are easy for humans to overlook. Such insects also reproduce rapidly and thus are susceptible to treatments that are slow acting and can be transferred between pests.

Numerous designs of crawling insect pest stations are commercially available, some use large containment areas, while others use wide open, flat surfaces with various forms of attractants and capture mechanisms, such as glue boards. Problems exist with such devices. For example, cockroaches have been observed to contact the edges of glue boards and escape. It was discovered that when such glue boards were rolled into cylinders, cockroaches would fill the underside of the glue roll. Similarly, a flat glue board was placed with its glue side or sticky side down and another flat glue board was placed with its sticky side up. It was found that the entire surface of the glue side down board was filled while only the edges of the sticky side up board were filled. Thus, it is desirable to provide a crawling insect monitor that is directed to crawling insets who desire small, narrow, or covered spaces.

Many of the currently available crawling insect pest stations also leave the glue surface or the pesticide surface exposed to environmental conditions such as light, water and physical objects that could impact effectiveness. This also leaves potentially hazardous substances typically found in glues and pesticides exposed to potential human contact. This also exposes the pesticides and glues to other physical contacts that may erode their presence and thus minimize their effectiveness. It is therefore also desirable to provide an attraction station having features that are effective at concealing and protecting the attracting, trapping, and killing areas of the station.

It is further desirable to provide an attraction station that maximizes the effectiveness of pesticides and allows for safe monitoring and killing of crawling insects and insect colonies while providing a dual action treatment that either captures the crawling insect or exposes the insect to pesticide.

SUMMARY OF THE INVENTION

In one embodiment, the invention is a crawling pest monitor and a product transfer station designed to hold and protect a pest attractant, a pest trapping mechanism and a pesticide. The crawling pest station is designed to monitor for pest activity in the zone of influence and expose visiting pests to slow-acting pesticide treatments that result in a transfer of pesticide product back to harborage areas.

A domed container having a base member which may be flat, curved or of varying contour, a curved or angled upper member connected directly or by one or more intermediate members to the base member, a tacky surface on one of the base member or the upper member, the tacky surface either being a tacky substance applied directly to the base member's upper surface/upper member's lower surface or to another piece of material that this secured to the base member or upper member, a pesticide which is placed opposite the tacky surface on the interior of the station, such as being either applied directly to the curved upper member's lower surface or removably secured to the upper member's lower surface, and an attractant placed in between the upper member and the base member.

In another embodiment, the invention is a wall-mounted attraction station for killing crawling insects. The station includes at least one member mounted to a wall, preferably removably mounted to the wall. This may be accomplished with a station that includes a base member that is secured to the wall by screws, tape, glue or other means. Alternatively, the base member may releasably connect to a second base member which is secured to the wall. For example, the station's base member may slide into the second base member so as to allow the station to be monitored easily, cleaned, replaced or refreshed as necessary.

It is further included to provide an attraction station that protects a sensing device that senses the presence of crawling insects that interact with the attraction station or that crawl in the vicinity of the attraction station. The attraction station can serve as a physical filter to reduce false positive signals from the sensing device and maximize signals related to crawling pest activity in the vicinity.

Figure 1:
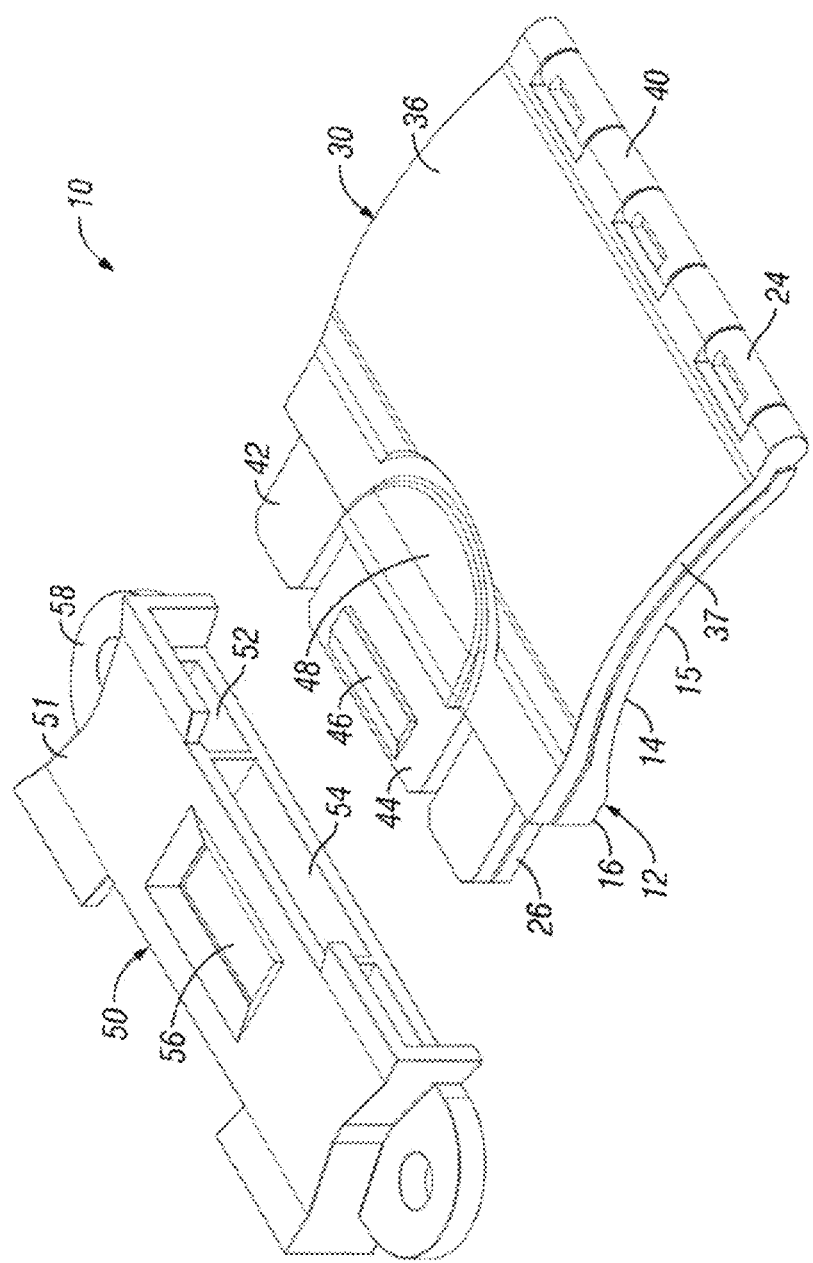
FIG. 1 is a perspective view of an insect monitoring station according to aspects of the invention.

Various embodiments of the present invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENTS

The figures show exemplary features and concepts of the invention by illustration. The intent of the preferred embodiments of the invention is to provide features that both attract and kill crawling insects on the interior of a structure in a shortened or finite window of time, while also exposing insects to an agent that can be taken back to a colony to reduce and/or eliminate a population of insects making up the colony. The window of time being measured generally from when the crawling insect enters an area, such as the interior or exterior area of the structure, and until the crawling insect is attracted to and killed by the attraction station. The stations can be used to monitor an area to determine if the area has an insect infestation that needs to be addressed with additional methods. Furthermore, a killing agent can be introduced at the station that can kill the insects at the station and also be taken back to the colony by an insect to reduce and/or eliminate the population of the colony.

Exemplary features and aspects of the present invention for monitoring, attracting, and killing crawling insects, such as cockroaches, beetles, etc., within a shortened window of time are illustrated in FIGS. 1-9. For example, FIGS. 1-4 show various views of an insect monitoring station 10 according to aspects of the invention. The monitoring station 10 includes a lower housing 12 and an upper housing 30 that are in rotatably communication with one another. As shown in the figures, this may be accomplished by each of the housing members 12, 30 having hinge components 24, 40, which, when connected together, allows the housing members to be rotated in relation to one another. This is best shown with FIGS. 1 and 4. In FIG. 1, the top member 30 is rotated to a closed position where it is in contact or near contact with the lower housing member 12. However, in FIG. 4, the top housing member 30 has been rotated via the hinge to allow access to an interior between the lower and upper members 12, 30.

It should be appreciated that, although the monitoring station 10 is shown to have two housing members each having hinge components 24, 40 that are snapped together to form the hinge, it is contemplated that other configurations allow the members to rotate relative to one another. For example, having portions with an axle, rod, or other member extending therethrough on each of the housing members would allow the members to rotate relative to one another as well. As will be understood, the rotating of the housing members allows access to an interior of the station 10 to monitor, modify, clean, replace, or otherwise manipulate the station 10, as needed.

Figure 2:
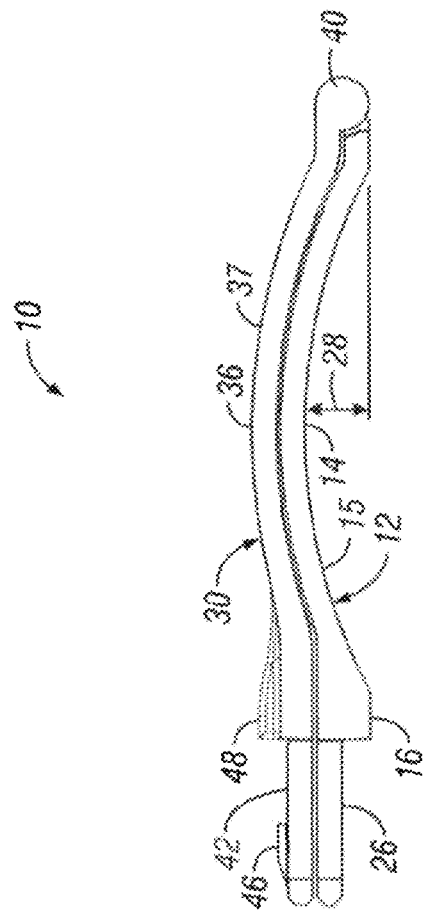
FIG. 2 is a side elevation view of the insect monitoring station of FIG. 1.
Figure 2:
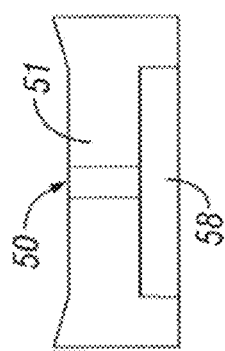
Figure 5:
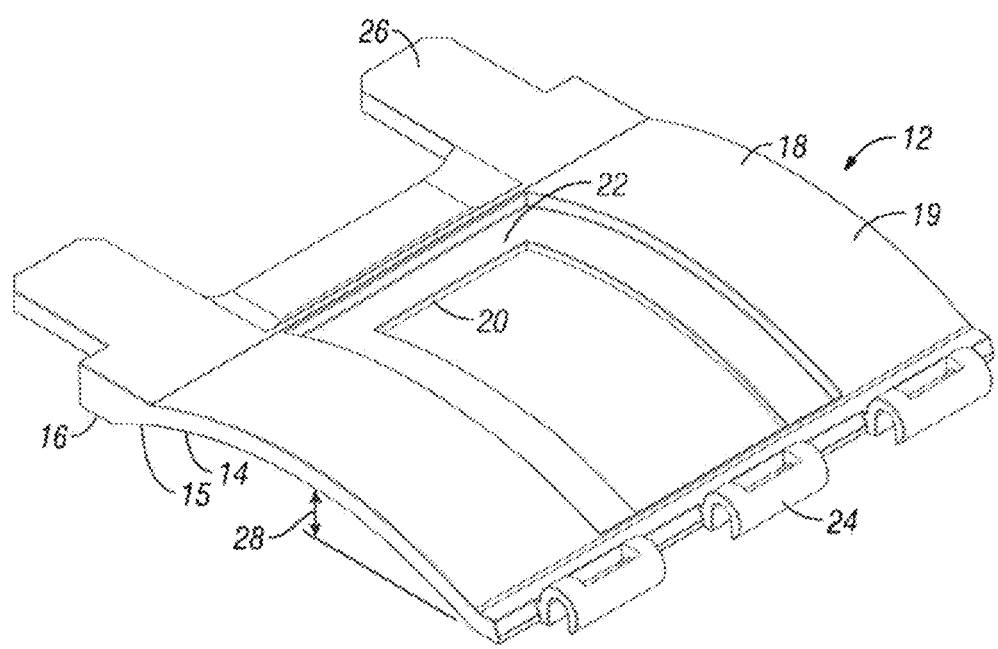
FIG. 5 is perspective view of bottom member of the insect monitoring station according to aspects of the invention.
Figure 6:
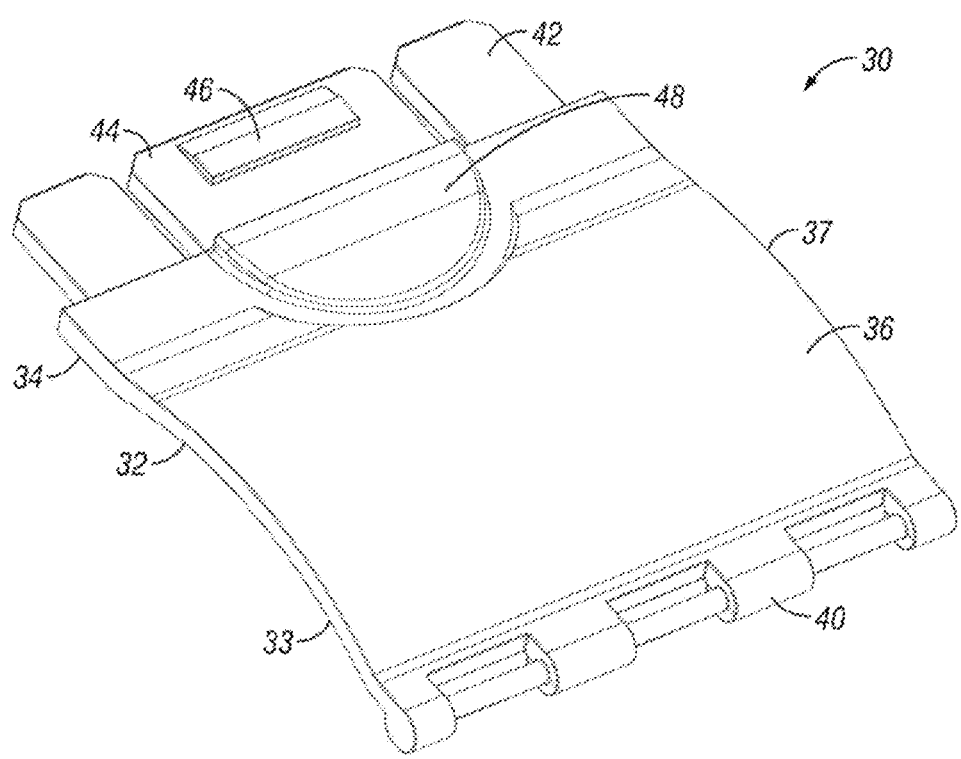
FIG. 6 is a perspective view of a top member of the insect monitoring station according to aspects of the invention.

The lower housing member 12 is shown throughout the figures, and is isolated in FIG. 5. The lower housing member 12 includes a lower surface 14 and an upper surface 18. The lower surface 14 includes a substantially planar portion 16 and a curved or domed portion 15. For example, as shown in FIG. 2, the planar portions 16 are positioned generally at each end of the curved or domed portion 15. The planar portions are not necessary in all embodiments.

Furthermore, it should be noted that the height of the peak of the curved portion 15 of the lower surface 14 has a height 28, which can be defined as the distance between the peak and the planar portions 16, or the peak and the surface to which the insect station is located. It is preferred in some embodiments that the height 28 of the peak of the curved portion 15 be from about ⅛ inches to about ½ inches. More preferably, the height 28 of the peak of the curved portion 15 is about ¼ inches. This height has been determined to be most effective for capturing insects traveling underneath, as will be explained. The width of the curved portion 15 can vary, and is not to be limiting to the invention.

The upper surface 18 of the lower housing member 12 also includes a curved portion 19, which runs substantially parallel with the lower surface 14. This also includes the substantially planar portions.

Other aspects of the lower housing member 12 include a cutout 20 through the upper and lower surfaces of the lower housing member 12, which can include a recessed section 22 generally outlining the cutout 20 and extending only partially through the surfaces. As will be understood, an adhesive 39 can be positioned at the cutout 20 and relative to the lower housing member 12 such that is exposed through the cutout towards the lower surface 14. The adhesive 39, in some embodiments, could be a glue board or other structure with a tacky surface that can be positioned at the cutout 20. For example, it is contemplated that the adhesive 39 could be a glue board that is sized to fit within the recessed portion 22 so that the ledge of the recessed portion 22 contacts a portion of the tacky surface to hold the adhesive 39 in place at the cutout 20. Insects that walk under the domed lower housing member 12 can contact the adhesive, such as by their wings contacting the tacky substance exposed through the cutout 20, and can become stuck thereat to trap the insect. Furthermore, to attract more insects into walking under the domed lower housing, an attractant may be added to the lower surface 14 of the lower housing 12 to lure the insect toward the adhesive 39 exposed at the cutout.

It should further be appreciated that, when only one housing is included, the cutout need not be included, and instead, the adhesive can be positioned directly on the underside of the domed/curved portion 15 of the lower surface 14. However, having the cutout 20 and the upper housing 30 will allow for easier access to the adhesive 39 such that it can be removed, examined, and/or replaced.

Extending from the lower housing member 12 at a side generally opposite the hinge 24 is a plurality of tabs 26. The tabs 26 are spaced apart and are configured to be inserted into a base member 50 to connect the lower housing member 12 thereto, which can temporarily connect the lower housing member 12 to the base member 50. This connection, along with the upper housing member 30, will allow the station 10 to be positioned on generally any surface and at generally any orientation. Therefore, the insect station 10 is not limited in its ability to be used on or around any surface for trapping insects to monitor the level of insect infestation at a particular location.

As mentioned, the insect station 10 shown in the figures also includes an upper housing member 30 rotatably attached to the lower housing member 12. The upper housing member 30 includes a lower surface 32 and an upper surface 36 as well. The lower surface 32 may include portions that are substantially parallel to the lower housing 12, such as having one or more substantially planar portions 34 and a curved portion 33. The curved portion 33 may generally match the curve of the upper and lower surfaces of the lower housing member 12. This is also the case for the upper surface 36, which can include a similar curved portion 37. In addition, the upper housing member 30 includes a hinge portion 40 for communicating and/or interacting with the hinge portion 24 of the lower housing member 12 in order to allow the upper housing 30 to rotate relative to the lower housing. For example, in the figures, the hinge portion 40 of the upper member 30 is shown to have a plurality of rod or axle like members spaced by spacers. The hinged portion 24 of the lower member 12 is shown to have snap or clasping features that are able to snap onto the rods and to be held thereat to allow the rotation to occur.

Figure 7:
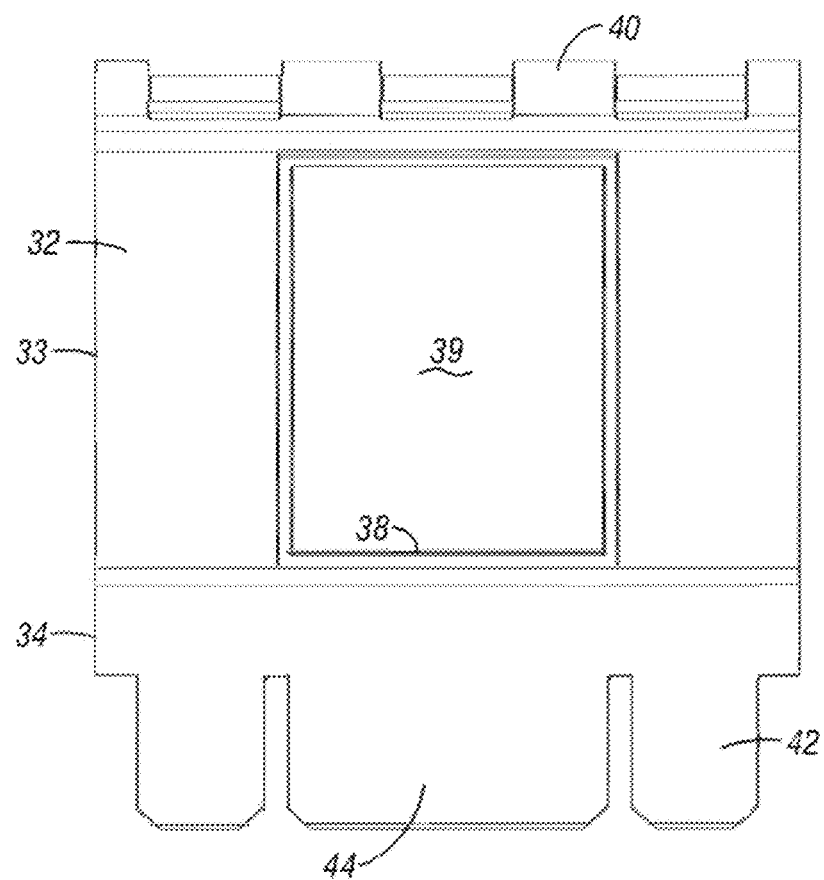
FIG. 7 is a bottom plan view of the top member of FIG. 6.

The underside of the upper member 30 is shown in FIG. 7. As shown, the lower surface 32 can include a boundary section 38 that can be formed by an extruded wall extending away from the lower surface 32. In FIG. 7, this boundary 38 is shown to be positioned generally on the curved portion 33 of the lower surface 32. The boundary 38 can be included as a section to position the adhesive 39, such as the glue board with the tacky surface. Still other types of adhesive materials may be used, such as, but not limited to, sprays, gels, liquids, glues, solids, and the like. The boundary 38 can provide guidance for orienting the adhesive material such that the adhesive will be substantially aligned with the cutout 20 of the lower housing member 12, which will aid in catching more insects as they pass under and/or through the station. It should be appreciated, however, that the boundary 38 need not be included in all embodiments, and that the adhesive could be included in the recessed portion 22 of the lower housing member 12, as has been previously disclosed.

Figure 3:
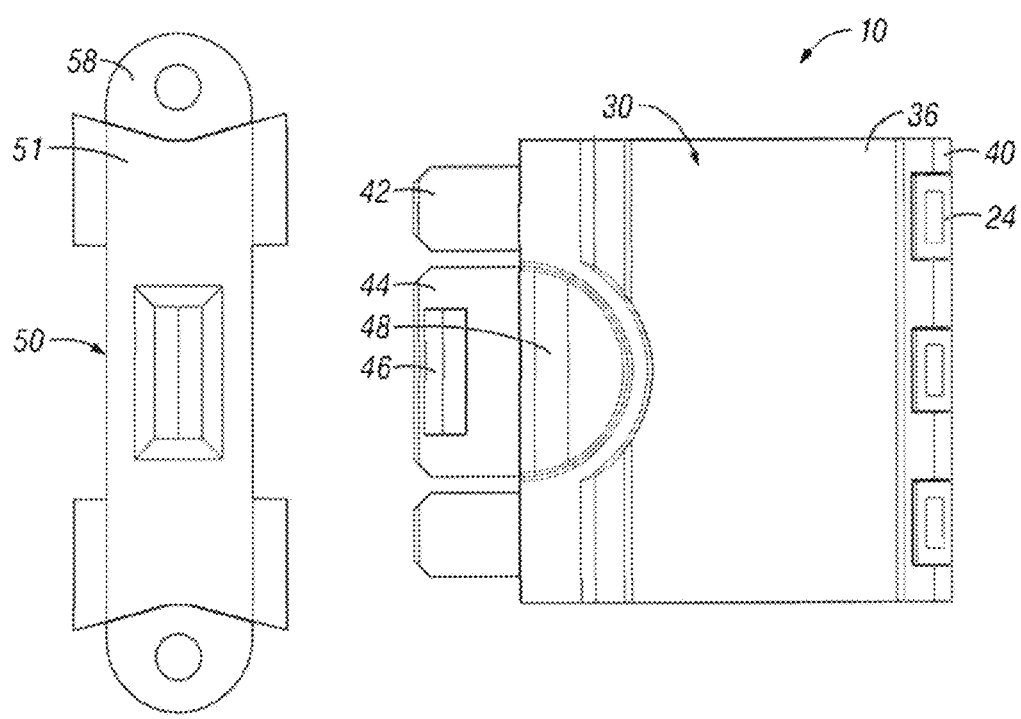
FIG. 3 is a top plan view of the insect monitoring station of FIG. 1.
Figure 4:
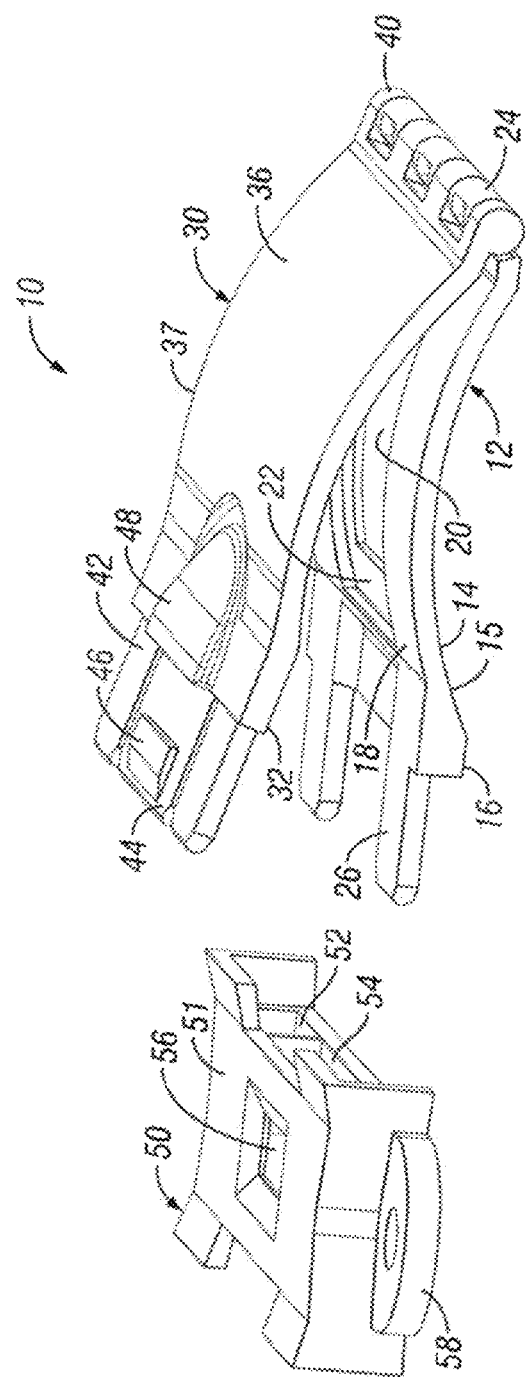
FIG. 4 is another perspective view of the insect monitoring station in a partially open configuration.

Additional aspects of the upper housing include tabs 42 that are inserted into the base member 50, as well as a central tab or snap member 44. The outer tabs 42 are substantially spaced and aligned with the lower tabs 26 of the lower housing member 12, as is shown in FIG. 3. This allows the pair of tabs 26, 42 to be insertable into the slots 52 of the base member 50, and can aid in the positioning and orientation of the insect monitoring station 10.

Furthermore, the upper housing member 30 can include a central tab 44, which may also be known as a snap member. The central tab includes a protruding portion 46, which is to interact with a cutout 56 in the base body 51, which will removably secure the lower and upper housing member 12, 30 to the base 50. The snap member 44 can be activated by a button 48 of the upper housing 30. The button 48, when depressed, will press the central tab 44 as well. Lowering the tab 44 enough will allow the protruding portion 46 to become disengaged from the base cutout 56, which will allow the lower and upper housing members 12, 30 to be released from the base 50. To re-attach the components, the tabs of the housing members are aligned with the slots of the base 50 and the housing members are inserted until the protruding portion 46 of the central tab 44 is repositioned in the base cutout 56. As the central tab 44 is generally resilient, this will hold the housing members in place relative to the base, such that the monitoring station 10 can be positioned in generally any orientation and at generally any location.

Figure 8:
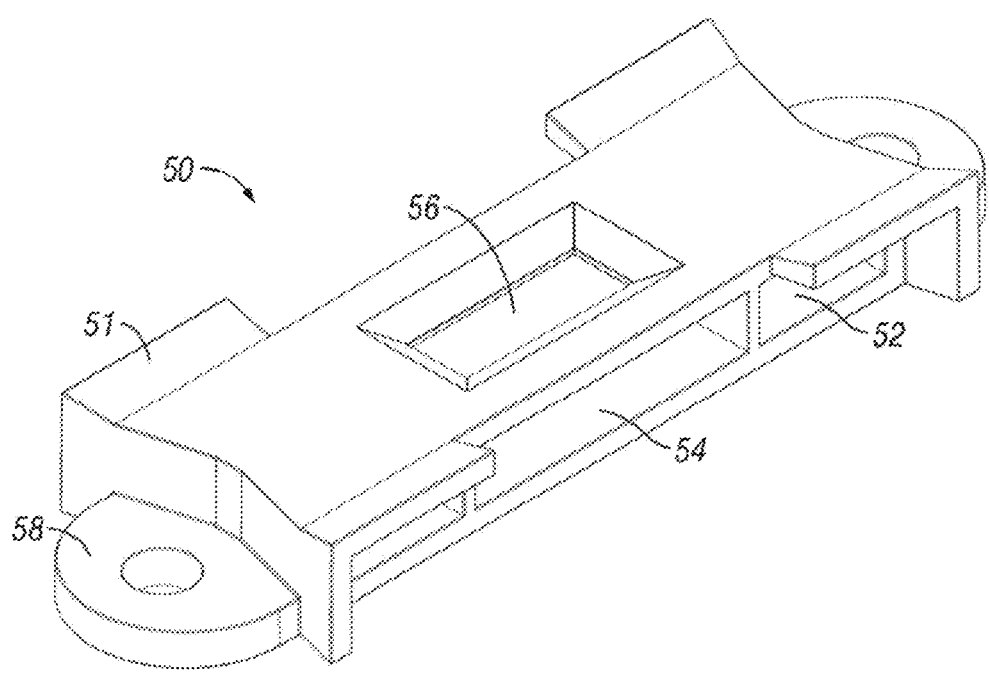
FIG. 8 is a perspective view of a base member of the insect monitoring station according to aspects of the invention.

The base 50 is shown in isolation in FIG. 8. As mentioned, the base 50 includes a base body 51. Tab slots 52 are positioned through the body on opposite sides of the snap slot 54. The slots are configured to align with the tabs 26, 42, 44 of the housing members. The cutout 56 is also shown in FIG. 8, and is positioned to receive the protruding member 48 of the central tab 44, which aids in holding the components of the monitoring station together.

Also shown in FIG. 8 extending from the ends of the base 50 are securing tabs 58. The securing tabs or flanges 58 are shown to be curved members, but may take generally any shape or form. Furthermore, the securing tabs 58 are shown to include apertures thereto. The base 50 can be positioned at generally any location to determine if insects are present. For example, the base 50, and thus, the insect station 10, can simply be put on a ground surface, such as the floor, without securing the station 10 in place. However, if the station 10 is to be secured in position, the tabs 58 or other securing means can be utilized. This can be especially helpful when the surface attaching the station to is a ceiling, vertical wall, or other non-horizontal surface. The base 50 can be secured to the surface in a number of ways. For example, in the configuration shown in FIGS. 1-8, the tabs 58 can be used with screws, bolts, hooks, rods, pins, or other connecting or surface penetrating members to extend through the tabs and into the surface. The connection members would hold the base 50 and any connecting housing members in place independent of the orientation thereof. However, this is not to be the only way to secure the station 10 to a surface. For example, adhesives could also be added to the base to removably secure the base 50 to a surface at any orientation. A recess, such as a groove, can be formed into the underside of the base 50 (opposite the snap cutout 56) to receive and house and adhesive, when used. The adhesive could also be placed at the underside of the tabs 58 for removably securing the base to a surface. In any manner, it is to be appreciated that the base 50 and corresponding insect station could be secured to a surface at generally any orientation, configuration, or the like.

Figure 9:
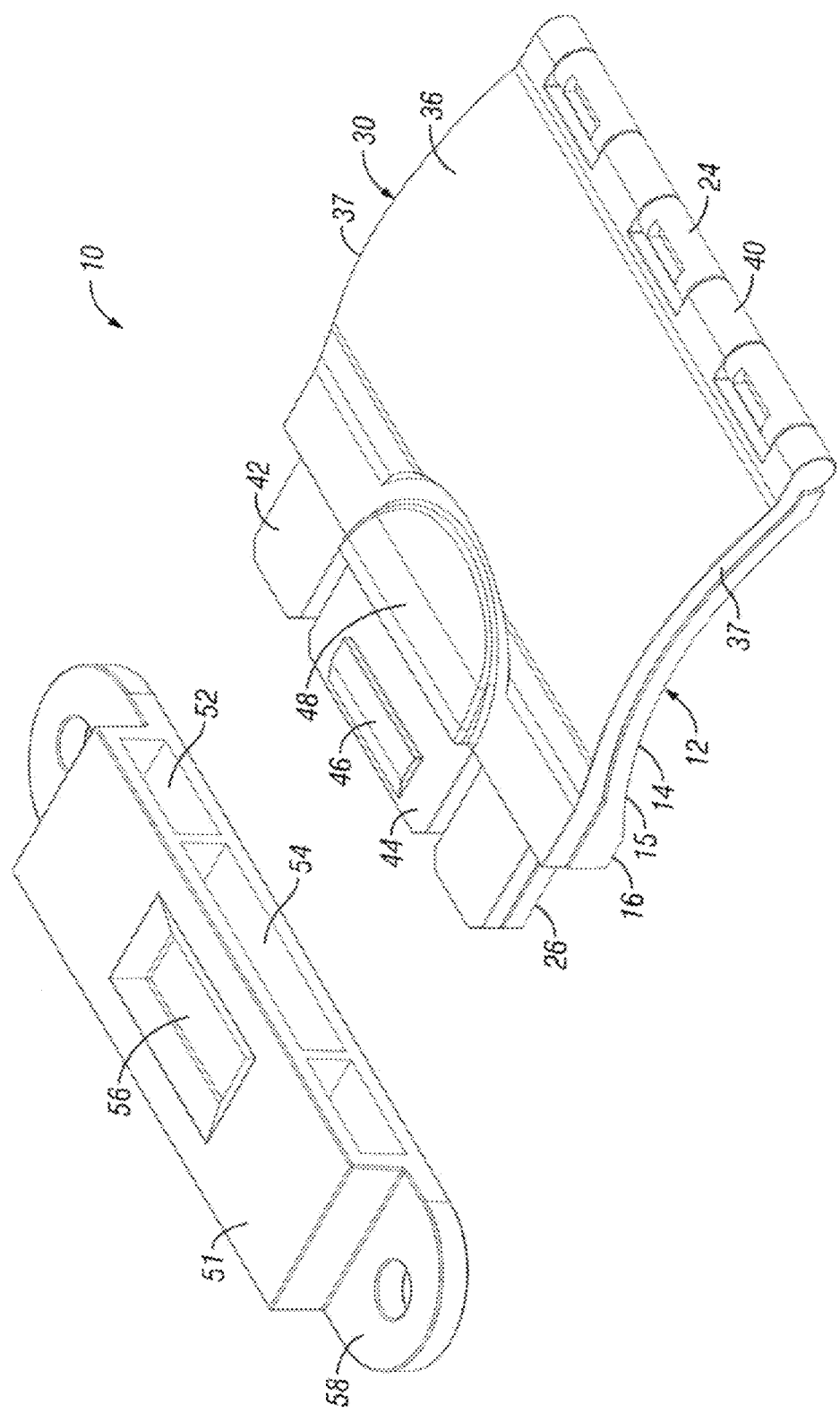
FIG. 9 is a perspective view of yet another embodiment of an insect monitoring station according to aspects of the invention.

The base 50 can take generally any shape as well. For example, FIG. 9 shows a base 50 that is shaped different than the base of FIGS. 1-8. However, the base in FIG. 9 includes many of the same features as those previously disclosed, which allows the base to be used with the housing members to form the insect station as has been disclosed and described.

Therefore, the insect station 10 as has been shown and described provides a hinged book style station, with an upper housing 30 and lower housing 12 hingeably connected to one another such that the housings can be opened. An adhesive is positioned generally between the housings 12, 30, with at least a portion of a tacky part of the adhesive 39 being exposed to and through a lower surface 14 of the lower housing 12. The housings include a curved portion, with the curved portion 15 of the lower surface 14 of the lower housing 12 having a height 28 at the peak of the curve. The height is preferred to be from about ⅛ inches to about ½ inches, and more preferably to be about ¼ inches. This height has been shown to be most effective in catching an insect, such as the wings of the insect, to the adhesive for trapping the insect to the insect station 10.

In use, an adhesive 39 is positioned in the hinged housing members, and a location is determined for determination of a number of insects in an area. A base 50 may be removably secured at the selected location, such as by screws, adhesives, pins, hooks, bolts, rods, or other connecting members to hold the base 50 in place. The housings with the adhesive are attached to the base 50 by aligning the tabs of the housings with the slots of the base 50. This may also include inserting at least one resilient tab with a protruding member to become positioned in at least one cutout of the base 50, wherein the tab and base interact to be held in place.

A selected amount of time is allowed to lapse, and then the station 10 checked to determine the number of insects caught by the station. The number of insects attached to the adhesive can be an alert as to an infestation or to determine if a more aggressive extermination is required to rid the area of the insects. Therefore, the insect station 10 can be used as a monitoring device to alert a user if there is an insect problem at the location of the station 10.

The insect station 10 is small enough to be generally non-noticeable in use, but large enough that the adhesive is able to collect a number of insects to determine if there is an insect problem. The station 10 can also be varied in size to monitor insects and bugs of different sizes.

Furthermore, additional means for attracting insects to the station can be used, such as adding an attractant to the underside of the curved portion or on the surface opposite the curved surface of the lower housing member. Pesticides could also be added on and around the components of the insect station 10. The pesticides could be used to stick to the insects that may not adhere to the tacky surface of the adhesive. The insects would still take the pesticides with them and could pass these on to other insects, thus eliminating a number of insects not caught by the station. Still further, additional tacky surfaces can be provided to attempt to capture a larger number of bugs and insects.

There are many cockroach control products sold, including bait, gel, granule, and aerosol spray formulations. Baits are formulated as granules or solid blocks, gels, or liquids. Some bait products already have the active ingredient in the bait station, and others are packaged as a liquid that is poured into a bait container provided in the package. Gels typically come packaged with a syringe or a tube for dispensing. It is to be appreciated, that the use of varying types and ingredients for the pesticides could be used in order to prevent the buildup of a resistance to the pesticide. Therefore, according to at least some aspects of the invention, it is recommended to rotate use of a pesticide with the insect station when a pesticide is to be included. The present invention is not to be limited to particular pesticides, however, and it is to be appreciated that generally any type of approved pesticide could be used in conjunction with the insect station. Furthermore, the pesticides could be included in, on, and/or around the portions of the insect station, such as a coating on a surface or granules dispersed in the tacky surface of the adhesive.

The addition of a secondary element with the station as has been described can provide for additional benefits. For example, while the station will allow for monitoring and killing of insects, the addition of a secondary element, such as a glue board, attractant, pesticide, or some combination positioned at or near the station can further provide the benefit of killing both the insects in contact with the elements, as well as with controlling insect colony populations. A mat, coupon, board, or other secondary member can be positioned at or near a station, such as under the lower member of the housing. This secondary member can be coated or otherwise incorporated with an attractant, glue, pesticide, dust, killing agent, or some combination thereof. For example, a killing agent could be utilized that attaches or is ingested by a crawling insect such that the insect is able to return to its colony before the effects of the agent are fully felt. At this point, the agent can be passed to the other members of the colony, which could in effect, eliminate an entire population of insects in an area.

The monitoring station can provide protection for the secondary member or element. Further, while some examples of killing and/or control agents have been disclosed, it is to be appreciated that this is not to be an exhaustive list. For example, any pesticide or killing agent is contemplated to be included or used with a monitoring station. This includes, but is not limited to, repellant and non-repellant pesticides, dusts, aerosols, glues, and the like.

It is contemplated that a crawling insect can come in contact with the killing agent when approaching the station. The station, as has been disclosed, provides a covered area that shelters the insect from light, which makes it an attractive location. When the insect returns to its colony, it can take back portions of the killing agent to spread to other insects in order to kill off other members of the colony population.

Testing has shown that the combination of the insect station and a killing agent can greatly increase the mortality rate of a colony of insects. For example, in one such test, a colony was prepared in which approximately 100 cockroaches formed said colony. These consisted of 20 adult males, 30 adult females, and 50 nymphs. It was found that the use of the insect station with a one-inch panel containing a glue, an attractant tablet, and a non-repellant pesticide killed 99% of the colony within one week of introduction. Using only the attractant and a non-repellant pesticide killed 55% of the colony after one week, and just the use of the pesticide resulted in 31% of the colony being killed within one week of introduction.

The components of the insect station can comprise a number of materials, such as rigid materials. For example, the components may comprise molded polymers that are attached to one another. The material used to form the housing may be translucent to allow for visual inspection, if desired. While the station has been described as being made from a molded plastic, it can also be formed from any structurally rigid material such as steel, aluminum, cardstock, wood, or other material. In some embodiments, the housing members may comprise a one-piece molded object or printed object (e.g., 3D printed), wherein the finished product includes the two housing members being rotatable to one another. The opening ability of the housing members, and the removability of the housing members from the base, allows for a simple design that can be inspected, maintained, and serviced with ease. This can include monitoring of the adhesive, replacing the adhesive, and/or replenishing or refreshing the attractants and/or pesticides.

Additional modifications or alternatives to the insect station 10 as shown and described may be included. For example, the insect station 10 can include a first panel or bottom member that is preferably generally planar and has a surface configuration to provide a surface which can be tacky or contain a pesticide. The panel is preferably a flat panel, but may also be curved, formed with angled panels, have a wavy surface or otherwise be formed as desired for the particular crawling insect.

The member can be connected to a top member, which may be one or both of the housings, either directly or through one or more intermediate members. For example, one or more side walls may be included that connect the bottom member to the top member(s). For example, the top member may be connected to the bottom member by another hinge or be slideably connected so as to be easily replaceable. The top member can be curved to include a rolled or domed structure. The space in between the top member and the bottom member can forms an interior that has one or more openings. The interior height between the housing members can be similar to the height of the lower housing curved surface, as previously disclosed.

A pesticide can be applied to a lower surface of the top member. Alternatively, the pesticide may be applied to an upper surface of the bottom member. A tacky or sticky substance, such as an adhesive, can be added opposite the pesticide on the interior of the station 10. In this manner, the pesticide and the sticky substance are contained within the interior, thus increasing their protection from water, light and other potential environmental contaminents. This also helps to minimize the potential for human contact with potentially hazardous surface treatments and maximizes the life of the pesticides used against the crawling insects. As they are on opposite sides of the interior, the pesticide acts with the crawling insect that is not caught by the sticky substance.

According to additional aspects of the invention, the insect station 10 of the invention may be a molded plastic housing. The housing can include a first side and a second side. A thin side wall on the first side acts as a hinge and a snap or other securing means secured at the second side allows for the interior to be accessed as desired. This allows the user to check to see how many insects have been captured and to monitor for insect activity. The material used to form the housing may be translucent to allow for visual inspection, if desired. While the station has been described as being made from a molded plastic, it can also be formed from any structurally rigid material such as steel, aluminum, cardstock, wood, or other material. Preferably, the housing is the size of a deck of cards or half a deck of cards.

An additional aspect of the invention is the provision of an easily removable and replaceable station 10. Preferably, a bottom member of the housing is removably secured to the wall or desired surface. For example, the bottom member may be slidably received in a second base member that is secured to the wall. The second base member may be screwed, glued or otherwise secured to the wall to keep it in place both during use and when the remainder of the station 10 is removed for service or replacement. In this manner, an attractant or other portions of the station 10 can be replaced without needing to replace the entirety of the housing 10. Alternatively, the pesticide or sticky surface may be placed on one or more removably secured chemistry panels. The removably secured chemistry panel may be slidably removable or secured by removable tape, hook and loops, or other means to the interior of the station 10. This allows a user to replace only the desired portion of the station 10.

Still further, it should be appreciated that the insect station 10 of the invention can be used in conjunction with other monitoring systems, such as electronic, remote monitoring systems. The station 10 could interface with such an electronic monitor such that it would reduce or otherwise mitigate false positive signals of the electronic monitors and would maximize signals related to crawling pests. For example, the station 10 could protect or otherwise be positioned in the vicinity of an electronic sensing device, such as those disclosed in U.S. patent application Ser. Nos. 12/414,155, 10/400,952, and 10/400,951, which are hereby incorporated by reference in their entirety. The sensing device generally senses the presence of crawling insects that may interact with the insect station 10 of the invention. This includes any insects that may be within the vicinity of the station. The station 10 of the invention could serve as a physical filter to reduce false positive signals from the sensing device and maximize signals related to the crawling pests in the vicinity. This could be done by the use of a camera sensing the station 10 such that a user can view the number of insects crawling in, on, or around the station 10. Other electronics, such as optical sensors, ultrasonic sensors, proximity sensors, and the like, could be used in conjunction with the station 10 to aid in determining a number of insects in an area, such as that in or around the area of the insect station 10.

Furthermore, a sensor could be operatively connected to the insect station 10 to provide an alert to the electronic sensing system to indicate that an insect has crawled in the area covered by the insect station 10. The alerts would indicate to a user that there is insect activity in or around the insect station such that the user could know to check the insect station for the amount of insects caught.

The combined use and interfacing of the insect station 10 and an electronic sensing system would provide yet another layer of alert, monitoring, and/or data for a user to indicate if there is a problem with insects that may need to be addressed in another manner. Therefore, it is to be appreciated that the combination and/or interfacing of the insect station 10 can be done with generally type of monitoring system used or considered for monitoring the number of crawling insects.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the claims.

The materials used in the following Examples are provided herein:

Insect Grease (50/50 Petrolatum and Mineral Oil)
Carbon Dioxide
Laboratory strains of adult German Cockroaches (*Blattella germanica*), approximately 7 weeks old as well as German cockroach nymphs approximately 3 weeks old were reared on Rodent Chow in temperature ranges of 78-82° F., and approximately 30-40% relative humidity. Conditions of a 12 hour light: 12 hour dark cycle were used unless otherwise noted.

Example 1

For each replicate to be tested, a large food tote was prepared by first greasing the middle of the food tote with a thin layer of insect grease and then placing a piece of rodent chow, cardboard harborage and moistened water wick in the food tote. Carbon dioxide was then used to anesthetize tubs of German cockroaches of the appropriate ages. The number of cockroaches per tote was determined so that for each test bait, there are three totes of 20 adult male cockroaches, 30 gravid female cockroaches, and 50 cockroach nymphs. The cockroaches were allowed a minimum of 24 hours to recover from the effects of the carbon dioxide prior to testing.

Figure 10:
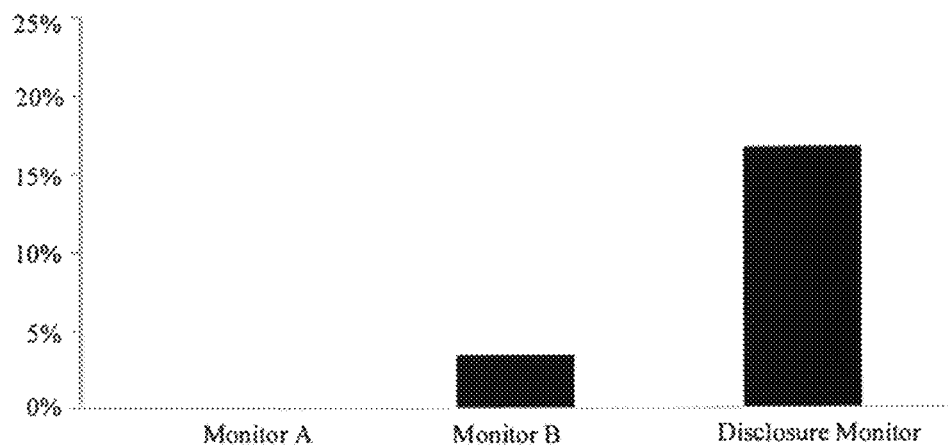
FIG. 10 is a graph indicating the number of insects caught during the first 60 interactions.

To determine the number of interactions between the cockroaches and the trap, three monitors were videotaped and the first sixty interactions with each trap were counted. The three monitors were a commercially available trap comprising a generic tented paper cockroach monitor with a glue board on the floor of the tent (Monitor A), a commercially available cockroach monitor comprising a round plastic cockroach with ramps leading to a glue board and including an attractant tablet placed on the glue board (Monitor B), and a monitor exemplary of the disclosure (Disclosure Monitor). Monitor B also include a top that conceals from view cockroaches that are caught on the glue board. FIG. 10 represents the number of cockroaches caught during the first 60 interactions. As shown, the Disclosure Monitor achieved a significantly higher percentage of interactions resulting in a catch. Monitor A did not catch anything and Monitor B caught less than 5%, whereas the Disclosure Monitor caught nearly 20%.

Example 2

Figure 11:
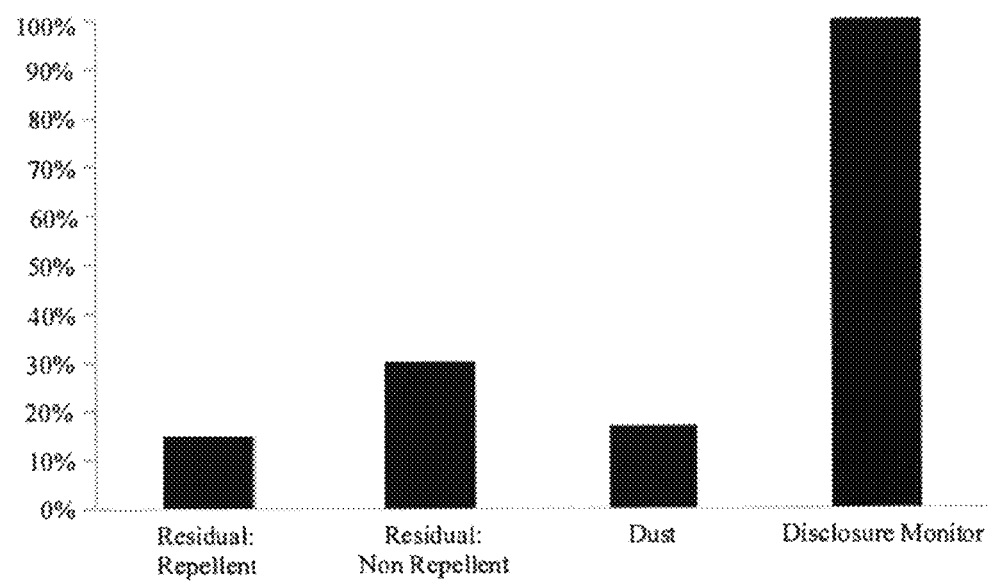
FIG. 11 is a graph indicating the mortality of insects after 1 week of exposure to the invention as compared to other commercially available products.

The previously described test preparation of Example 1 was modified by including a 1 inch panel with a pesticide formulation. In this test, a liquid residual known for being repellant to insects, a liquid residual known for not being repellant to insects, and dust formulation of a pesticide were placed in the colony testing containers. The embodiment of the present invention (the Disclosure Monitor) contained a glue board, an attractant tablet, and a treatment of non-repellent pesticide. FIG. 11 shows data collected from the colony after 1 week. As FIG. 11 shows, the present invention achieved a 99% mortality after one week of interaction. This was substantially better than the control pesticides. The residual non-repellant had the second highest mortality rate, which was only 30%.

Example 3

Figure 12:
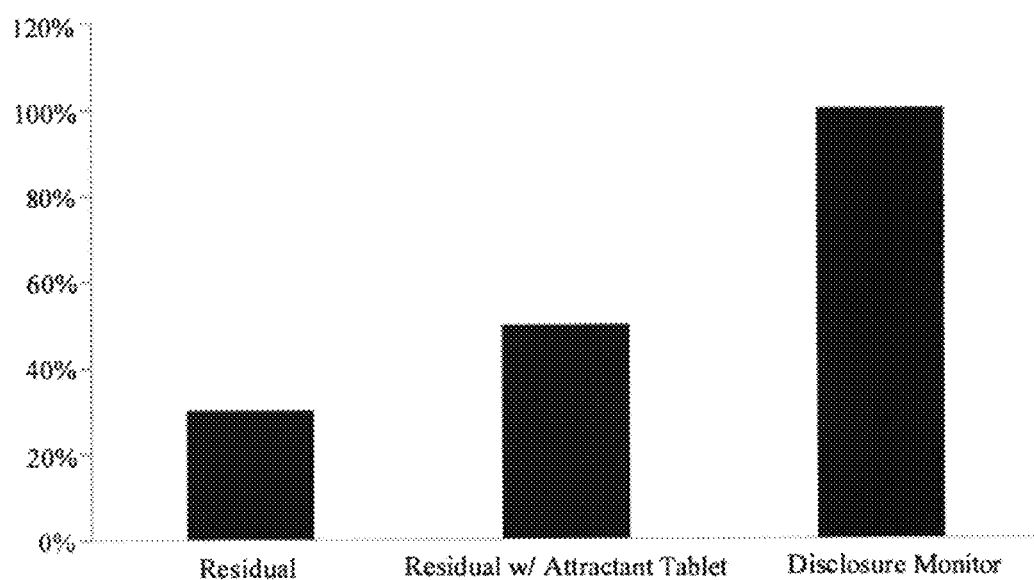
FIG. 12 is a graph indicating the morality of insects after 1 week of exposure to the components of the invention.

Using a modified test procedure from Example 2, the different components of the invention were test separately. A 1 inch panel was used for the treatment of pesticide. The prototype contained a glue board, an attractant tablet and a treatment of a non-repellant pesticide. FIG. 12 shows that present invention (the Disclosure Monitor) achieved a 99% mortality after one week of interaction. Again, the exemplary apparatus and pesticide of the invention significantly outperformed the controls. The second highest mortality rate was the residual with an attractant tablet and that achieved less than 60% mortality.

While the crawling insect station 10 here and before described is effectively adapted to fulfill the aforementioned objectives, it is to be understood that the invention is not intended to be limited to the specific preferred embodiments of the aspects disclosed and set forth above. Rather, it is to be taken as including all reasonable equivalents to the subject matter of the appended claims.

What is claimed is:

1. A system for detecting and reducing a population of a colony of crawling insects, the system comprising:
    an insect station comprising:
        a curved bottom member having an aperture in a recessed portion of the curved bottom member;
        a curved top member substantially parallel to the curved bottom member; and
        a primary element comprising an adhesive exposed through the aperture in the bottom member; and
    a secondary element positioned below the bottom member curved portion, wherein the secondary element comprises an attractant tablet or a non-repellant pesticide.

2. The system of claim 1, wherein:
    the bottom member has a bottom member upper surface and a bottom member lower surface with the aperture located at a curved portion of the bottom member;
    the top member is operatively connected to the bottom member, the top member having a top member upper surface and a top member lower surface and being curved substantially equal to the curved portion of the lower member; and
    the adhesive is positioned on the top member lower surface and aligns with the aperture.

3. The system of claim 1, wherein the secondary element is configured to kill at least 99% of members of the population of the crawling insect colony.

4. The system of claim 1, further comprising a sensor for alerting when the system has interacted with a crawling insect.

5. The system of claim 1, wherein the non-repellant pesticide is a coating.

* * * * *